ARTHUR P. PEYROUSE.
Improvement in Cloth Strip Bristles.
No. 120,320.  Patented Oct. 24, 1871.
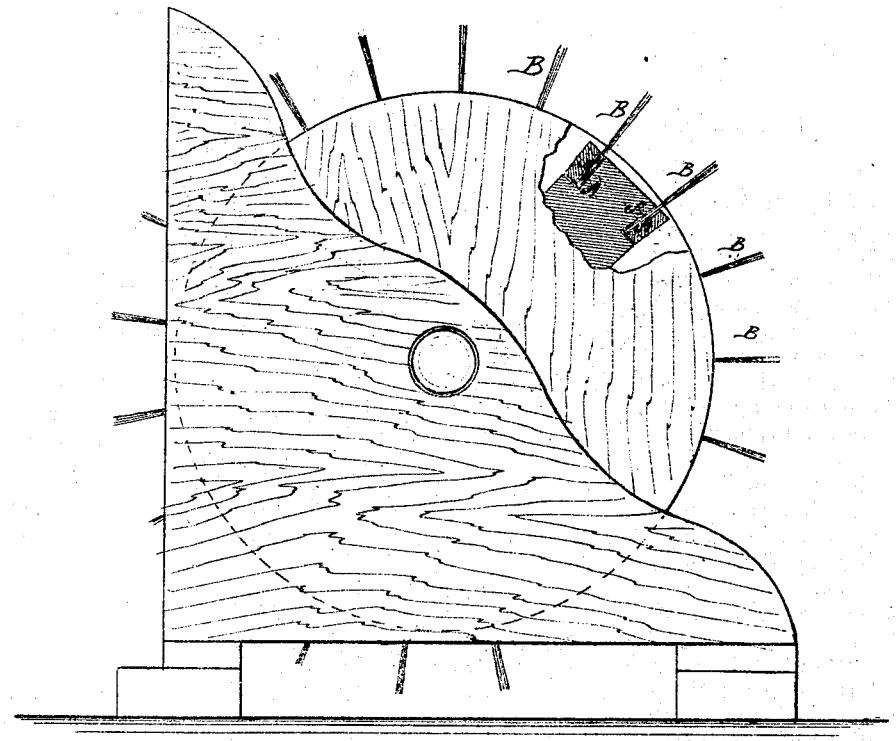
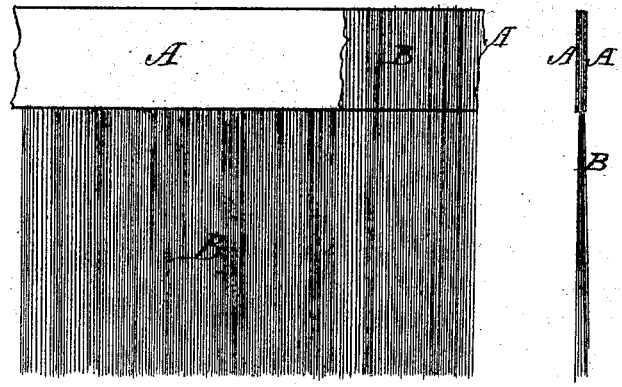

UNITED STATES PATENT OFFICE.

ARTHUR P. PEYROUX, OF NEW ORLEANS, LOUISIANA.

IMPROVEMENT IN CLOTH-STRIP BRISTLES.

Specification forming part of Letters Patent No. 120,320, dated October 24, 1871.

*To all whom it may concern:*

Be it known that I, ARTHUR P. PEYROUX, of New Orleans, in the parish of Orleans and State of Louisiana, have invented a new and useful Improvement in Cloth-Strip Bristles; and I do hereby declare that the following is a full, clear, and exact description thereof, which will enable others skilled in the art to make and use the same, reference being had to the accompanying drawing forming a part of this specification, in which—

Figure 1 is a view illustrating the use of my improved cloth-strip bristles. Fig. 2 is a side view of a portion of a strip, part being broken away to show the construction. Fig. 3 is an end view of the same.

Similar letters of reference indicate corresponding parts.

My invention has for its object to furnish improved cloth-strip bristles designed for use in repairing all kinds of cotton-gins that can be repaired with strip-bristles, and which shall be durable, easily applied, and reliable in use; and it consists in the cloth-strip bristles prepared as hereinafter more fully described.

The cloth-strip bristles are made of two bands or strips, A, of linen or cotton-buckram or other suitable cloth. The strips of cloth A I prefer to make about three-quarters of an inch wide and about thirty-inches long. The strips A are furnished or trimmed with boars' bristles B of various qualities and prices. The strips A are covered or coated with a gum or paste made of water, good cabinet-glue, Spanish whiting, and marble-dust or powder, and heated to the required consistency. The bristles B are then spread over the strips A thus prepared, by hand, with a tool or implement. The cloth-strip bristles thus prepared are placed under a screw or other press to make them of equal and uniform thickness, and to fasten the strips and bristles well together.

The cloth-strip bristles thus prepared are not affected by water, moisture, dampness, or heat, and will remain sound and perfect under long-continued use.

Having thus described my invention, what I claim as new, and desire to secure by Letters Patent, is—

The cloth-strip bristles constructed substantially as herein shown and described, and for the purpose set forth, as a new article of manufacture.

ARTHUR P. PEYROUX.

Witnesses:
CHR. LOUQUE,
E. AMADIO HAUDRY. (41)